United States Patent
Leung et al.

(10) Patent No.: US 6,446,139 B1
(45) Date of Patent: Sep. 3, 2002

(54) MULTIPLE CHIP SINGLE IMAGE BIOS

(75) Inventors: Wendy Q. Leung, San Ramon; Sau Ken Eng, Fremont; Felix Chinn, Sunnyvale, all of CA (US)

(73) Assignee: Adaptec, Inc., Milpitas, CA (US)

(*) Notice: Subject to any disclaimer, the term of this patent is extended or adjusted under 35 U.S.C. 154(b) by 0 days.

(21) Appl. No.: 09/340,539

(22) Filed: Jun. 28, 1999

(51) Int. Cl.[7] .................. G06F 9/445; G06F 13/00; G06F 13/100; G06F 15/177; G06F 1/24

(52) U.S. Cl. ............ 710/1; 710/2; 710/8; 710/10; 710/62; 713/1; 713/2; 713/100

(58) Field of Search ................. 710/1, 2, 8–10, 710/62, 110; 707/203, 511; 713/1, 2, 100

(56) References Cited

U.S. PATENT DOCUMENTS

| | | | | | |
|---|---|---|---|---|---|
| 5,301,328 A | * | 4/1994 | Begur et al. | .................. | 711/201 |
| 5,325,532 A | * | 6/1994 | Crosswy et al. | ................ | 713/2 |
| 5,418,918 A | | 5/1995 | Vander Kamp et al. | .... | 395/375 |
| 5,473,775 A | * | 12/1995 | Sakai et al. | ..................... | 713/2 |
| 5,603,055 A | * | 2/1997 | Evoy et al. | ..................... | 713/2 |
| 5,675,795 A | * | 10/1997 | Rawson, III et al. | ............ | 713/2 |
| 5,694,600 A | | 12/1997 | Khenson et al. | ............. | 395/652 |
| 5,696,968 A | * | 12/1997 | Merkin | ........................... | 713/2 |
| 5,835,760 A | * | 11/1998 | Harmer | ......................... | 713/2 |
| 5,854,905 A | * | 12/1998 | Garney | ........................ | 710/104 |
| 5,887,164 A | * | 3/1999 | Gupta | ............................ | 713/2 |
| 5,892,943 A | * | 4/1999 | Rockford et al. | ............... | 713/2 |
| 5,909,592 A | * | 6/1999 | Shipman | ........................ | 711/4 |
| 5,933,652 A | * | 8/1999 | Chen et al. | ..................... | 710/1 |
| 6,009,520 A | * | 12/1999 | Gharda | ........................... | 713/1 |
| 6,061,745 A | * | 5/2000 | Mahmoud | ...................... | 710/1 |
| 6,122,734 A | * | 9/2000 | Jeon | ............................... | 713/2 |
| 6,145,078 A | * | 11/2000 | Akamatsu | ....................... | 713/2 |
| 6,173,398 B1 | * | 1/2001 | Kim | .............................. | 713/2 |
| 6,173,417 B1 | * | 1/2001 | Merrill | ......................... | 714/15 |
| 6,192,456 B1 | * | 2/2001 | Lin et al. | ..................... | 711/173 |
| 6,272,584 B1 | * | 8/2001 | Stancil | ........................ | 710/241 |
| 6,282,647 B1 | * | 8/2001 | Leung et al. | ................ | 713/100 |

OTHER PUBLICATIONS

Jerry Jex, "Flash Memory BIOS for PC and Notebook Computers", Communications, Computers and Signal Processing, 1991, IEEE Pacific Rim Conference vol. 2, pp. 692–695.*

* cited by examiner

Primary Examiner—Christopher B. Shin
Assistant Examiner—Tanh Q Nguyen
(74) Attorney, Agent, or Firm—Martine & Penilla, LLP

(57) ABSTRACT

A single BIOS image generating option ROM code, and method for initializing controller chips of a computer system are provided. The method includes the operations of integrating a set of controller chips to a motherboard, and generating a table that identifies the set of controller chips and PCI device function addresses of the set of controller chips. The method then includes identifying one of the set of controller chips to be a master controlling chip and those other than the master controlling chip to be non-controlling chips. Then a single generic option ROM code is generated for the set of controller chips. Once generated, the table and the generic option ROM code is stored in a system BIOS ROM of the computer system during boot-up.

19 Claims, 7 Drawing Sheets

MULTIPLE CHIP SINGLE IMAGE BIOS

BACKGROUND OF THE INVENTION

1. Field of the Invention

This invention relates generally to computer systems, and more particularly to the reduction of option ROM code stored in system RAM after boot-up of a computer system.

2. Description of the Related Art

Today's personal computer systems provide users with a high degree of flexibility in terms of the number of peripheral devices that may be connected to a given system. For instance, users are able to connect additional internal and external peripheral devices to meet the storage or data access demands required to complete the user's job. By way of example, users are able to connect additional internal or external hard drives, compact disc (CD) players, digital video disc (DVD) players, compact disc recordables (CD-Rs), etc.

To meet the connection needs for these peripheral devices, most computers have IDE connectors and PCI connectors built into the computer's motherboard. Typically, the IDE connectors are used to connect internal devices, such as, hard drives and CD-ROM drives. The PCI connectors are generally configured to receive host adapter cards, which allow the connection of both internal and external devices. As is well known, there are numerous types of host adapters, some of the most commonly used are SCSI host adapters, redundant array of inexpensive disk (RAID) host adapters, and the like. SCSI host adapters are one of the most popular adapters due to peripheral device arrangement flexibility and performance. For instance, one SCSI host adapter can serve as the communication link for up to 15 internal and external peripheral devices.

Most host adapters have option ROM chips integrated onto the printed circuit board of the host adapter card. The option ROM chip is typically an electrically erasable programmable read only memory (EEPROM), which stores program instructions that are used during the boot process of the computer system that has the host adapter card connected thereto. Without these program instructions, the host adapter card and any of the peripheral devices connected to the host adapter card will not be able to communicate with the host computer system during the boot up time, and thus, the system may not be able to boot. Host adapters without a EEPROM can only be used as a secondary host adapter.

In server applications, there is typically an increased need for additional storage devices, such as, hard drives, tape drives, removable drives, and the like. To meet this demand, motherboard manufacturers typically integrate controller chips directly to the motherboard to decrease the need for additional host adapters. FIG. 1A shows a computer system 100 having a motherboard 102. The motherboard 102 has, in this example, two controller chips 108a and 108b. If the controller chips are SCSI controllers, they can provide communication for internal devices by way of a PCI bus 110. In this simplified example, the motherboard 102 is shown having a system RAM chip 104, and the PCI bus 110 connected to host adapters (HA) 106. Typically, the HAs 106 are connected to the motherboard 102 by way of the aforementioned PCI connectors that are integrated to the motherboard itself. Each of the HAs 106 generally have their own controller chips 108 and option ROM chips (not shown). The HAs 106 therefore, enable communication with external devices, such as, devices D1–D6. The controller chips 108 are configured to provide communication for devices D7 and D8. In order to reduce system cost, some server motherboard manufacturers integrate substantially more controller chips 108 directly to the motherboard, thus reducing the need for more expensive HA 106 cards.

Although in theory any number of controller chips can be integrated to the motherboard 102 and any number of HAs 106 can be connected to PCI slots, there is a limitation in that the system BIOS only allocates a certain fixed amount of memory space in system RAM chip 104 for the BIOS code utilized by each of the controller chips 108.

During boot up, the system BIOS, via the PCI bus, will locate each of the controller chips 108 connected to the computer system 100 and copy their associated option ROM BIOS into the system RAM 104 chip. As shown in FIG. 1B, the system RAM 104' has a fixed amount of space that is allocated for all of the option ROM BIOS code. Typically, the range of allocated space ranges between address C000h and DFFFh (i.e., about 128 k of memory space).

When the option ROM code for a particular controller chip 108 is copied to the allocated system RAM 104', the initialization code that is part of the option ROM code is also copied to the RAM 104'. Once the initialization code completes the initialization process for a particular controller chip (i.e., has identified each of the devices connected to the controller chip), the initialization code for that particular chip is removed from the RAM 104'. Accordingly, FIG. 1B assumes there was enough space in RAM 104' for both the option ROM code (that includes runtime code (RTC) and initialization code) for each of the controller chips 108a–108d. However, when the RTC 113a and initialization code 113b for chip 108e is to be loaded to the RAM 104', there may not be enough space remaining for the initialization code between address C000h and DFFFh. If this happens, the option ROM code for the controller chip 108e will not be copied to the RAM 104', and therefore, the devices D4, D5, and D6 will not be made available to the users of the computer system 100.

Although in this simplistic example the runtime code (RTC) of the controller chips 108a–108d are successfully stored in the RAM 104', many server manufacturers are using motherboards that have increasingly more controller chips 108. In view of the allocated memory space limitations in the system RAM 104', the addition of more controller chips is resulting in situations where some devices are simply not available to users of the computer system.

In view of the foregoing, there is a need for an increased number of controller chips on motherboards, while reducing the usage of memory space in the option ROM code allocated memory space of a computer's system RAM.

SUMMARY OF THE INVENTION

Broadly speaking, the present invention fills these needs by providing a computer implemented method for generating a single image BIOS that can be used with a selected number of controller chips, and for an option ROM BIOS having a generic option ROM and a table that facilitates the generation on only one image BIOS. It should be appreciated that the present invention can be implemented in numerous ways, including as a process, an apparatus, a system, computer readable media, or a device. Several inventive embodiments of the present invention are described below.

In one embodiment, a method for initializing controller chips of a computer system is disclosed. The method includes the operations of integrating a set of controller chips to a motherboard, and generating a table that identifies the set of controller chips and PCI device function addresses of the set of controller chips. The method then includes identifying one of the set of controller chips to be a master controlling chip and those other than the master controlling chip to be non-controlling chips. Then a single generic option ROM code is generated for the set of controller chips. Once generated, the table and the generic option ROM code is stored in a system BIOS ROM of the computer system during boot-up.

In another embodiment, a method for generating a single image BIOS that functions with a plurality of controller chips is defined. The method includes: (a) providing a motherboard with the plurality of controller chips; (b) generating a generic option ROM code that is configured to operate with each of the plurality of controller chips; (c) generating a table that identifies each of the plurality of controller chips, and a PCI device function address for each of the plurality of controller chips; the table further includes information as to which one of the plurality of controller chips is a master controlling chip and which are non-controlling chips, and the generating of the generic option ROM code and the table defines an option ROM code; (d) and storing the option ROM code to a system BIOS ROM that is part of the motherboard. In this embodiment, when the computer is booted up, only the generic option ROM code is loaded into the system RAM when the master controller chip is initialized, and the same generic option ROM code is configured to initialize all the remaining controller chips in the table.

In still a further embodiment, a motherboard having a system RAM chip, a set of controller chips, and a system BIOS ROM chip is disclosed. The system BIOS chip includes generic option ROM code and a table identifying each of the controller chips and associated PCI device function addresses for the controller chips. A selected one of the set of controller chips is defined as a master controlling chip, and it will communicate with the generic option ROM code for initialization each one of the set of controller chips.

Advantageously, one BIOS image can now control a set of controller chips that may be integrated as part of a computer system's motherboard. Not only is less system RAM space used, but the system can now run faster because the controller chips already controlled by the one BIOS image will be skipped. In general, when a controller chip designated to be the master controlling chip gains control, the system is requested to list all of the devices plugged into the system. A check is then made as to which ones in the list can be controlled by the one BIOS image. The ones that can be controlled by the one BIOS will then be selected and generated into a table in the system memory (i.e., system option ROM chip). When the BIOS for a device gains control, a check is made to determine whether that selected device is identified in the table. If the selected device is in the table, the BIOS for that selected device will withdraw itself without loading a BIOS image into the system RAM. Accordingly, for all of the chips identified in the list, only one BIOS image will be copied into the system RAM. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method of generating a single image BIOS that can be used with a selected number of controller chips, and for an option ROM BIOS having a generic option ROM and a table that facilitates the generation on only one image BIOS. It will be obvious, however, to one skilled in the art, that the present invention may be practiced without some or all of these specific details. In other instances, well known process operations have not been described in detail in order not to unnecessarily obscure the present invention.

Figure 1A:
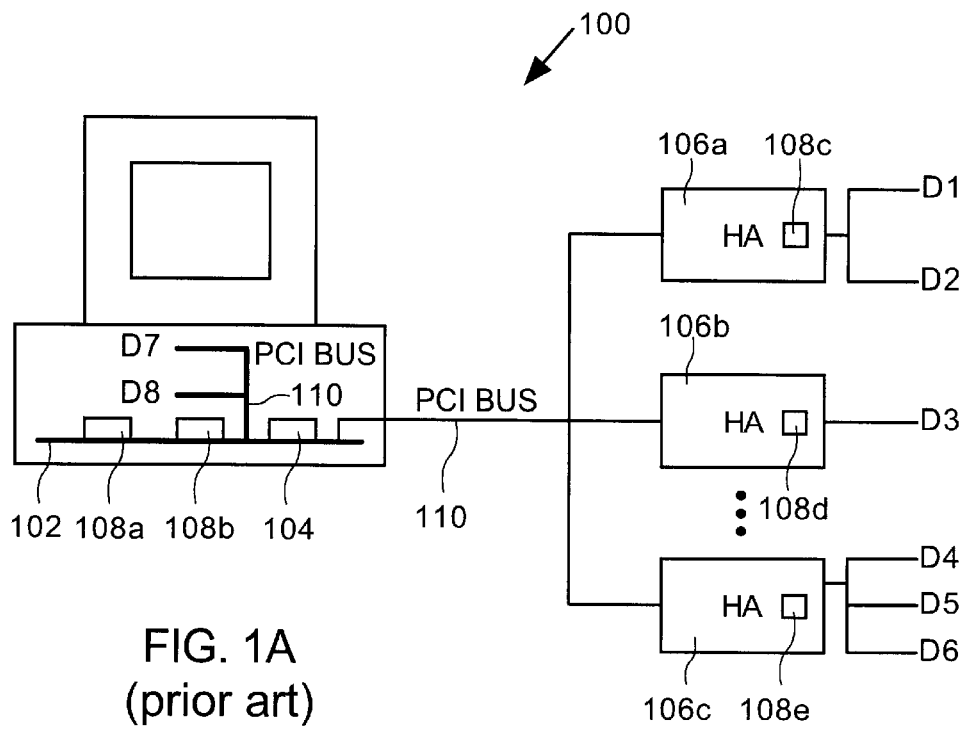
FIG. 1A shows a computer system having internal controller chips and host adapters connecting host adapters.
Figure 1B:
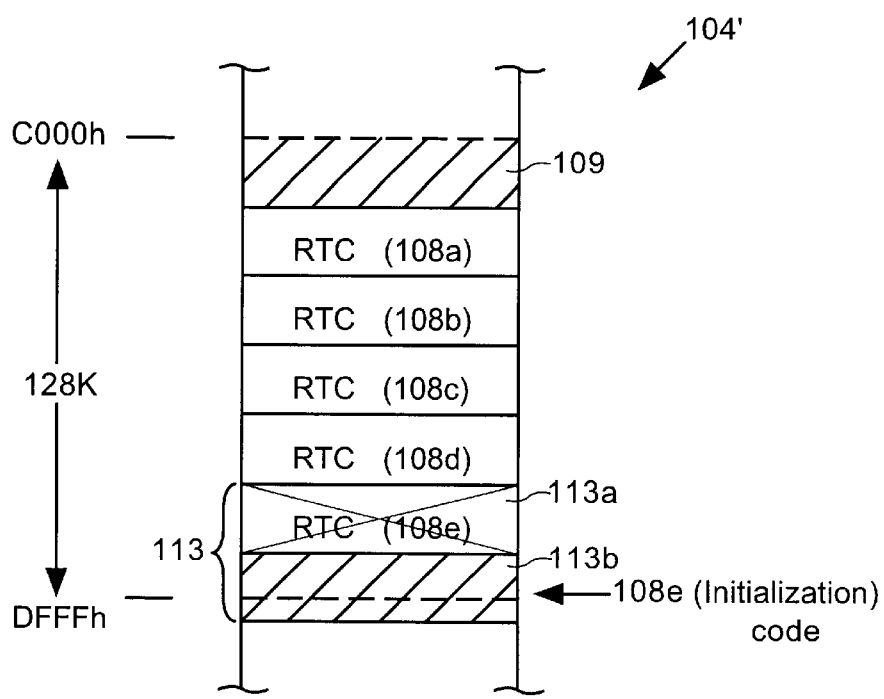
FIG. 1B is a simplified diagram of system RAM memory having multiple BIOS images.
Figures 2A, 2B:
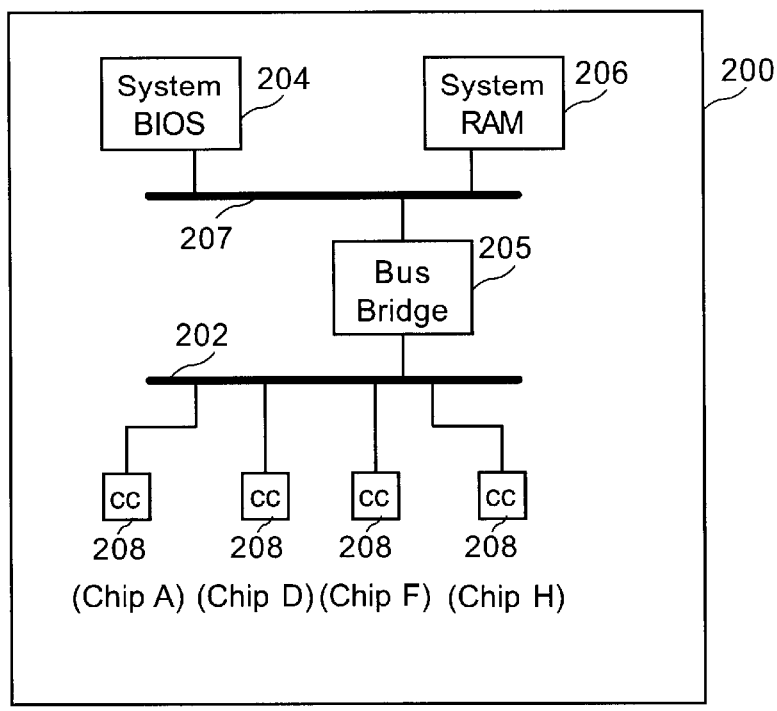
FIG. 2A illustrates a simplified block diagram of a motherboard having a set of controller chips, in accordance with one embodiment of the present invention.
FIG. 2B is a generated list of chips plugged into the computer system having the motherboard of FIG. 2A, and the selection of the set of controller chips actually plugged into the motherboard, in accordance with one embodiment of the present invention.

FIG. 2A illustrates a simplified block diagram of a motherboard 200, having a set of controller chips 208, in accordance with one embodiment of the present invention. The controller chips 208 are identified, for discussion purposes, as chip A, chip D, chip F, and chip H. Each of the set of controller chips 208 are coupled to a PCI bus 202, which in turn is coupled to a bus bridge 205. The bus bridge 205 is coupled to a system bus 207. System bus 207 is in communication with the system BIOS 204 and the system RAM 206. In one embodiment, the system BIOS 204, which is a ROM-type chip, is configured to store the option ROM code of each of the set of controller chips 208. The option ROM code for the set of controller chips 208, in this embodiment, is modified such that only one BIOS image is loaded into the system RAM 206 during boot-up.

Initially, code configured to provide a chip list 222 is run by the computer system having the motherboard 200. This code is preferably provided as a development kit to users or motherboard manufacturers. Preferably, an engineer that is configuring the motherboard 200 will preferably select from the chip list 222 those chips 208 that were integrated on the motherboard 200. The selected chips 224 are then associated with a PCI device function address 226. In general, the motherboard manufacturer will provide the PCI device function addresses 226 since it knows where the chips are integrated relative to the PCI bus. From this, a table (254 of FIG. 2C) identifying the chips 208 on the motherboard and the associated PCI device function addresses is created. During the generation of the table, one chip is assigned to be a master controlling chip and the other chips are identified as non-controlling.

At this point, the modified option ROM code 250 is generated. The generation of the modified option ROM code 250 preferably includes a generic option ROM code 252 and the table 254. The generic option ROM code 252 includes initialization code 252a and runtime code (RTC) 252b. The generic option ROM code 252 is configured to operate with each of the chips 208 that are part of the table 254. Once the option ROM code 250 is generated, it is flashed to the system ROM 204.

Figure 2C:
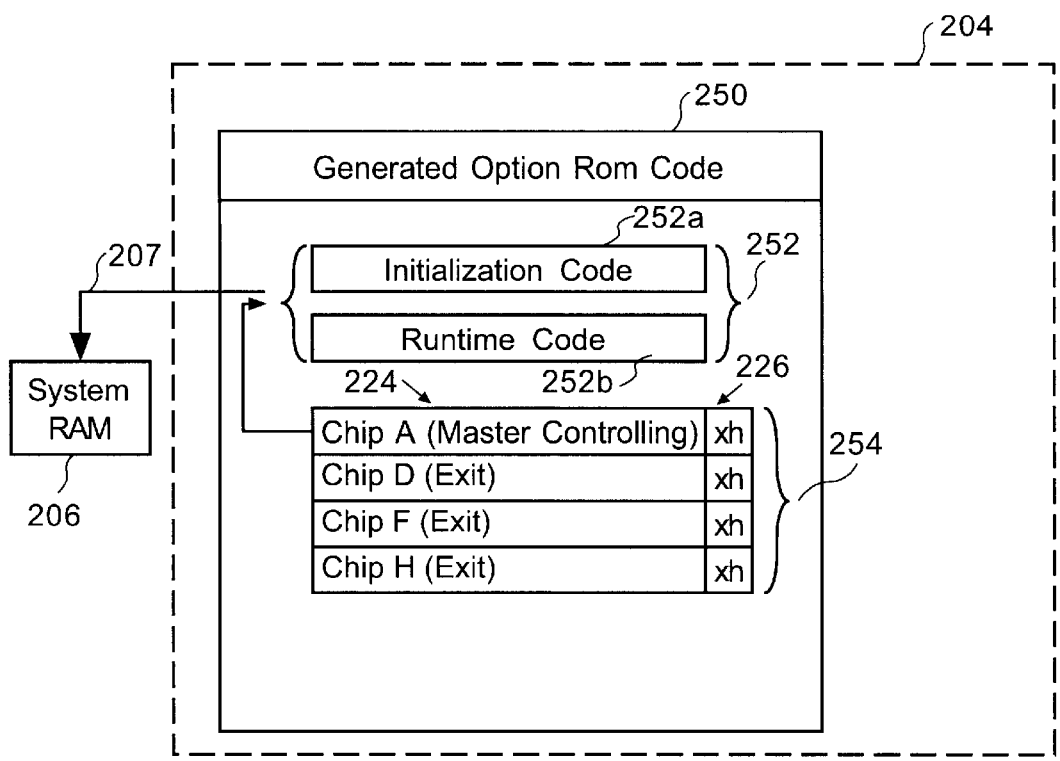
FIG. 2C illustrates a more detailed view of the system ROM chip having stored therein a generated option ROM, in accordance with one embodiment of the present invention.

The motherboard 200 of the present invention will now have a system BIOS 204 that includes standard system BIOS code (not shown) and the modified option ROM code 250. The computer system having motherboard 200 is now booted up, and during the boot-up process, the system BIOS will scan the PCI devices. During the scanning, the system BIOS will move to each of the set of controller chips 208 in order to load their option ROM code and initialize the devices connected to the controller chips. However, in this embodiment, when one of the chips 208 are scanned, the chip 208 will be configured to refer to the system BIOS to obtain its option ROM code. As shown in FIG. 2C, chip A was designated as the master controlling chip and chips D, F and H, were designated as non-controlling.

Figures 2D, 2E:
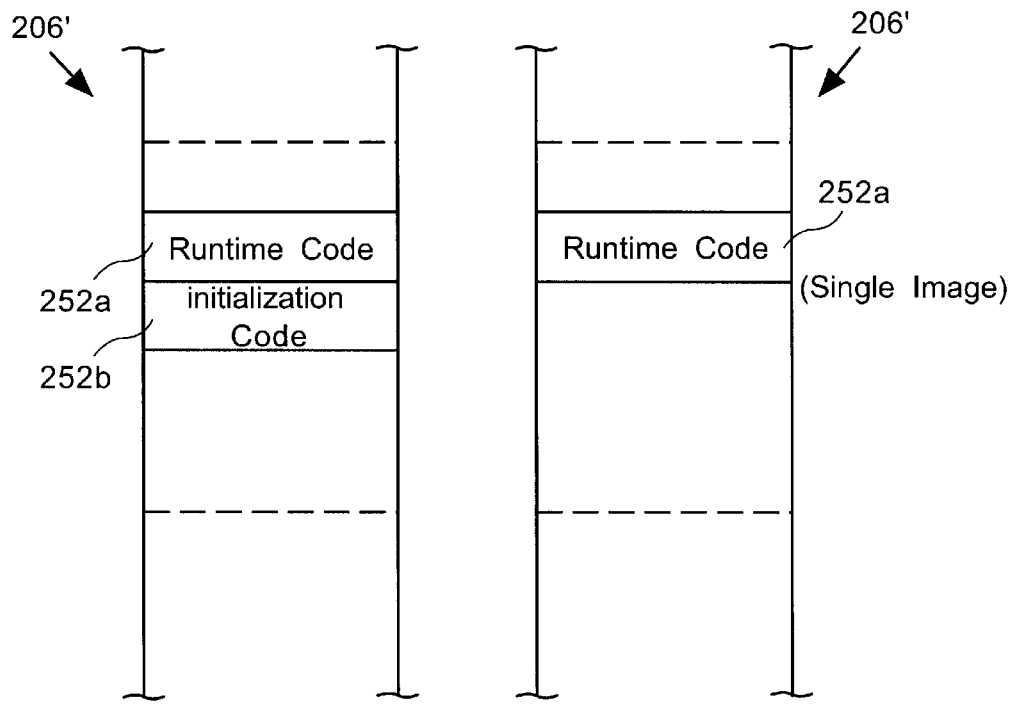
FIGS. 2D and 2E illustrate the allocated memory space in the system RAM, in terms of the single image BIOS, in accordance with one embodiment of the present invention.

When only one of chips D, F or H are scanned, and reference is made to the system BIOS (i.e., the system BIOS has the generated option ROM code 250 within the system BIOS), the option ROM code for that chip is not loaded into the system RAM 206. This is pictorially shown as "exit" for those chips within the table 254. On the other hand, when chip A is scanned, and reference is made to the system BIOS, the generic option ROM code will loaded into the system RAM 206' as shown in FIG. 2D. In addition, the generic option ROM code, which includes the runtime code 252a and the initialization code 252b will move to initialize each of the other chips 208 in the table (i.e., chips D, F, and H). Once initialization code 252b is done initializing the devices connected to the chips A, D, F and H, the initialization code 252b is removed from the system RAM 206', leaving a "single image" BIOS runtime code 252a as shown in FIG. 2E.

Figure 3A:
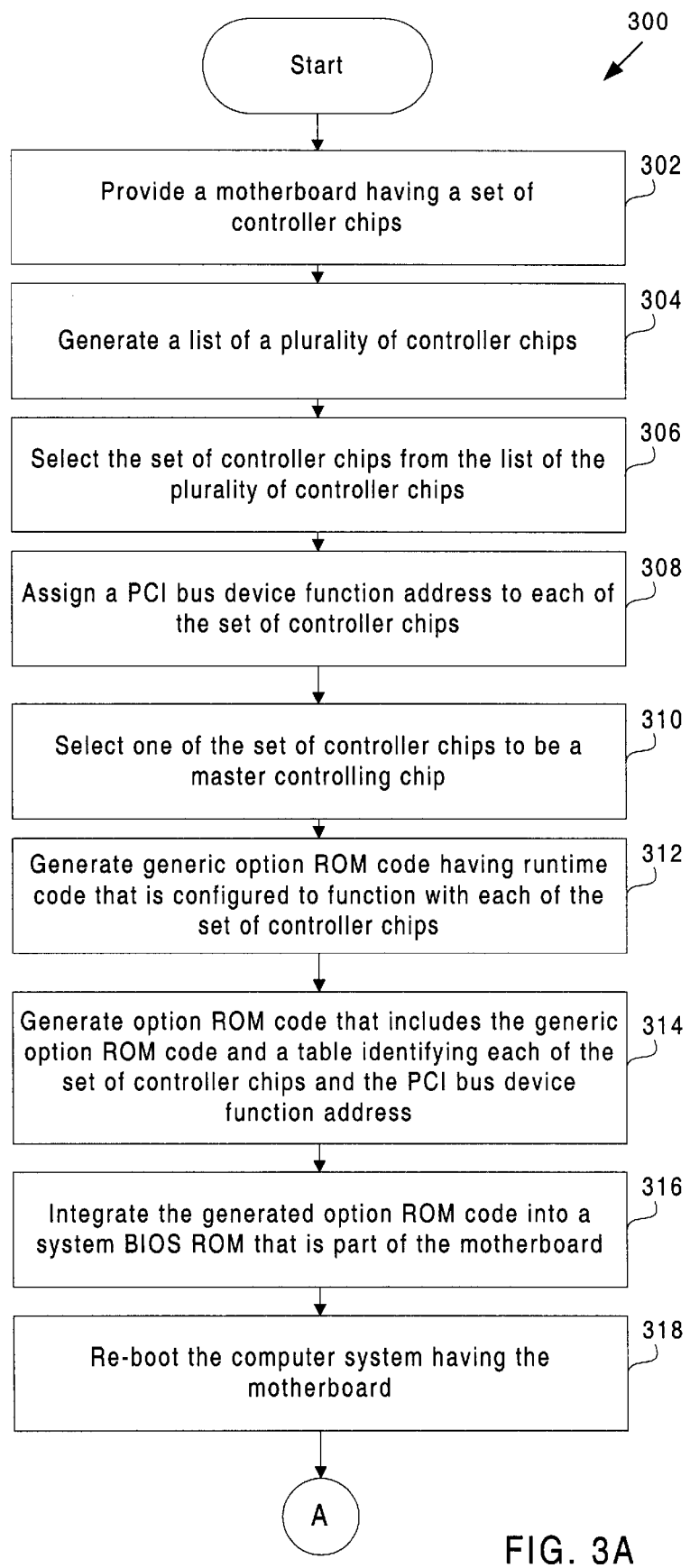
FIGS. 3A and 3B are flowcharts illustrating the method operations performed during the generation of an option ROM code that is configured to generically operate with a set of controller chips, in accordance with one embodiment of the present invention.

FIG. 3A provides an overview flowchart of the method operations performed during the generation of an option ROM code that is configured to generically operate with a set of controller chips, in accordance with one embodiment of the present invention. The flowchart 300 begins at an operation 302 where a motherboard having a set of controller chips is provided. Typically, the motherboard manufacturer will build a motherboard having a set of controller chips, such as SCSI controller chips that will enable communication to a given number of devices. Typically, in server applications, there is a need for many more peripheral devices, such as hard drives, which are not typically needed in normal workstation computers.

When the motherboard manufacturer is building the motherboard, the engineer or user will run a development kit program which will list a plurality of controller chips from which the engineer may select from in operation 304. By way of example, the list may include many more controller chips than those that were installed in the motherboard. Accordingly, the method will proceed to operation 306 where the engineer will select the particular set of controller chips from the list of the plurality of controller chips. The set of controller chips that were selected are those that were integrated to the motherboard by the motherboard manufacturer.

Because the motherboard manufacturer installed the controller chips into the board, the manufacturer will know the PCI bus function address for each of the set of controller chips. In the development kit program, the user will be queried as to what the PCI bus device function addresses are for the set of controller chips. Once that information is entered, the method will proceed to an operation 310. In operation 310, the engineer that is setting up the motherboard will select one of the controller chips via the development kit to be a master controlling chip. Once one of the selected set of controller chips is selected to be the master controlling chip, the method will proceed to an operation 312 where a generic option ROM code having runtime code that is configured to function with each of the set of controller chips is generated.

At this point, the method will proceed to an operation 314 where option ROM code that includes the generic option ROM code and a table identifying each of the set of controller chips and the PCI bus device function addresses. As shown in FIG. 2C, the table 254, in this example, includes chips A, D, F, and H. Each of the chips will have a respective PCI device function address 226. The PCI device function address 226 is shown here as "xh." The method now moves to an operation 316 where the option ROM code generated in operation 314 is integrated into the system BIOS ROM that is part of the motherboard. Once the generated option ROM code has been stored in the system BIOS ROM, the method will proceed to an operation 318 where the computer system having the motherboard is rebooted.

The method now moves to operation 320 where each of the set of controller chips listed in the table is initialized. The initializing of each of the set of controller chips is configured to be performed only by the master controlling chip, which in this example, is chip A. By way of example, if chip D of FIG. 2C is scanned first, the method will exit without copying the generic option ROM code 252 to the system RAM. In a like manner, if chips F or H are scanned, the method will also exit without copying the generic option ROM code 252 to the system RAM. However, when chip A is scanned, the code for chip A in the table 254 will point to the generic option ROM code 252.

At this point, the generic option ROM code 252 will be loaded into the system RAM 206. The initialization code and runtime code are generic, such that the initialization code will be capable of initializing chip A, chip D, chip F, and chip H. Once the initialization of all the chips in the set of controller chips is complete, the only runtime code that will be stored in the system RAM will be the single image runtime code 252a shown in FIG. 2E. As such, there is no need to store the runtime code for chips D, F, and H in the system RAM, thus saving memory space. Once the initialization is complete in operation 320, the method will proceed to an operation 322 where the remaining standard boot operations are completed.

Figure 4A:
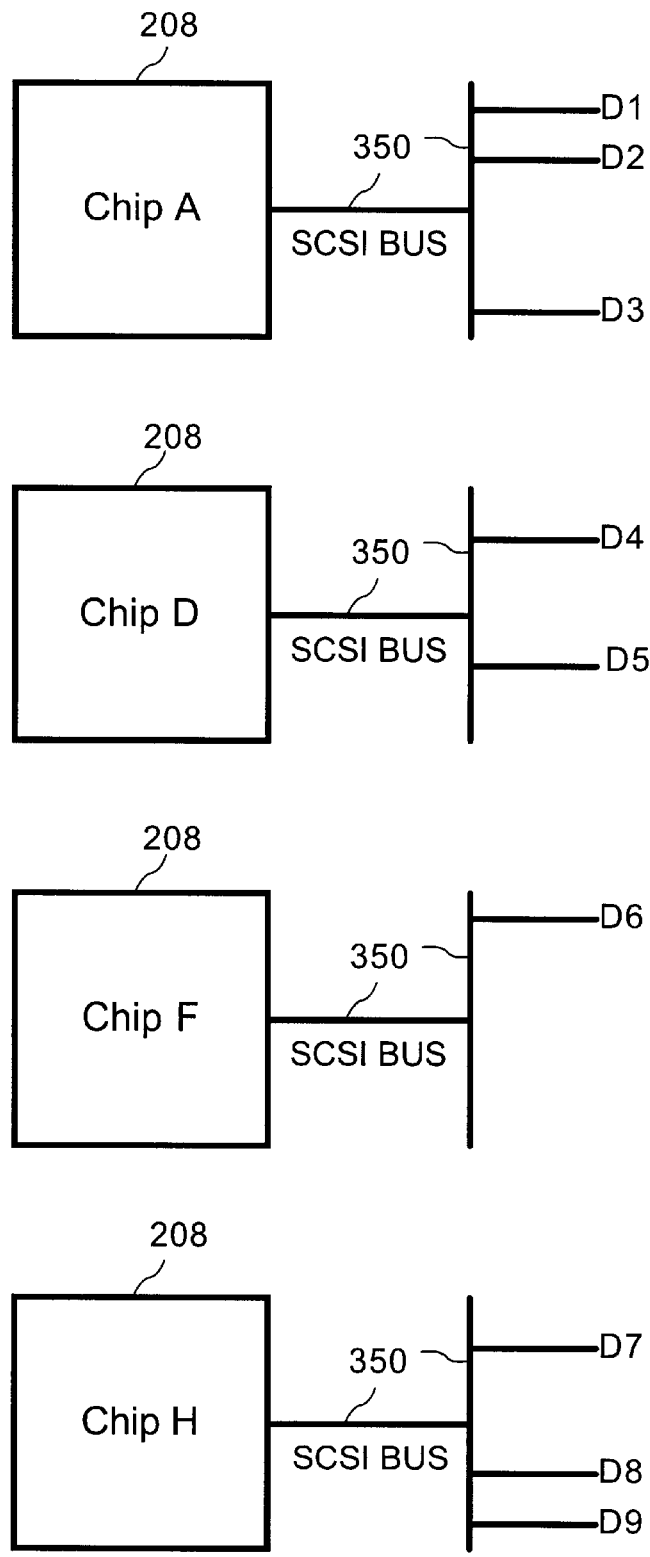
FIG. 4A illustrates a simplified diagram of chip A, chip D, chip F, and chip H, in communication with a SCSI bus, in accordance with one embodiment of the present invention.

FIG. 4A illustrates a simplified diagram of chip A, chip D, chip F, and chip H 208, in accordance with one embodiment of the present invention. In this example, each of the chips 208 are connected to an associated SCSI bus 350. The SCSI bus 350 will thus communicate to particular devices that may be connected to the motherboard. As shown herein, devices D1, D2, and D3 are coupled to the SCSI bus of chip A. Devices D4 and D5 are connected to the SCSI bus of chip D, device D6 is connected to the SCSI bus of chip F, and devices D7, D8 and D9 are connected to the SCSI bus of chip H.

In accordance with one embodiment of the present invention, before the devices D1 through D9 are initialized, the SCSI bus is typically reset. In the prior art, there is a need to wait about two seconds after resetting the SCSI bus for chip A before initializing the devices D1 through D3. Once the waiting time is complete and the reset has cleaned the SCSI bus so that the communication link can be built between the devices, the devices D1 through D3 are initialized. The resetting requirement is generally required by the SCSI specification.

However, in multiple chip applications, there is a need to reset each of the SCSI busses 350 connected to each of the controller chips 208. Accordingly, there is a substantial delay during the boot-up of a computer system when there is a need to reset a plurality of SCSI busses before devices can be initialized. In accordance with one embodiment, the resetting of the SCSI busses 350 of controller chips 208 will be performed in parallel. Accordingly, once the reset in parallel is performed for the SCSI busses of chip A, D, F, and H, there will only be a need to wait about two seconds before the initialization of the devices D1 through D9 can begin. It should be appreciated that the time savings during the resetting of the SCSI bus is substantial, especially in cases where there is a substantially large number of SCSI busses such as in server applications.

Figure 3B:
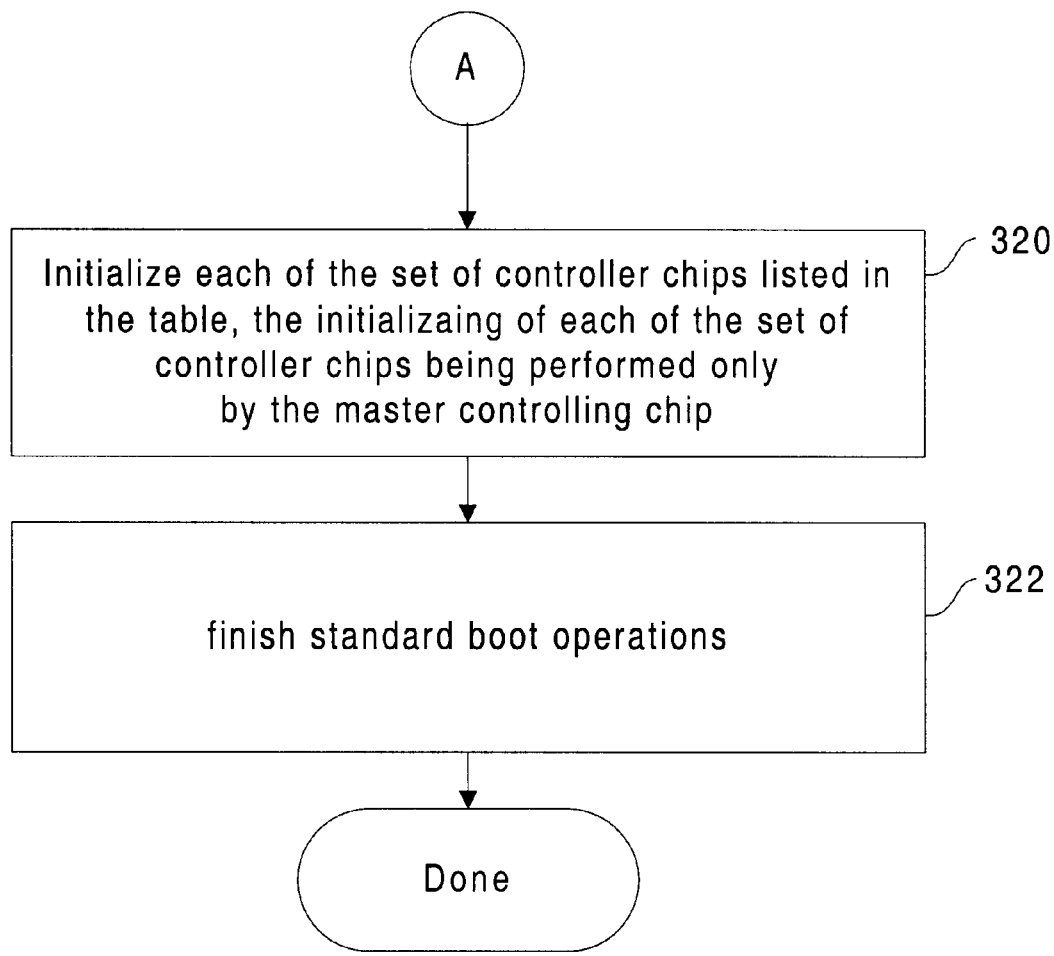
Figure 4B:
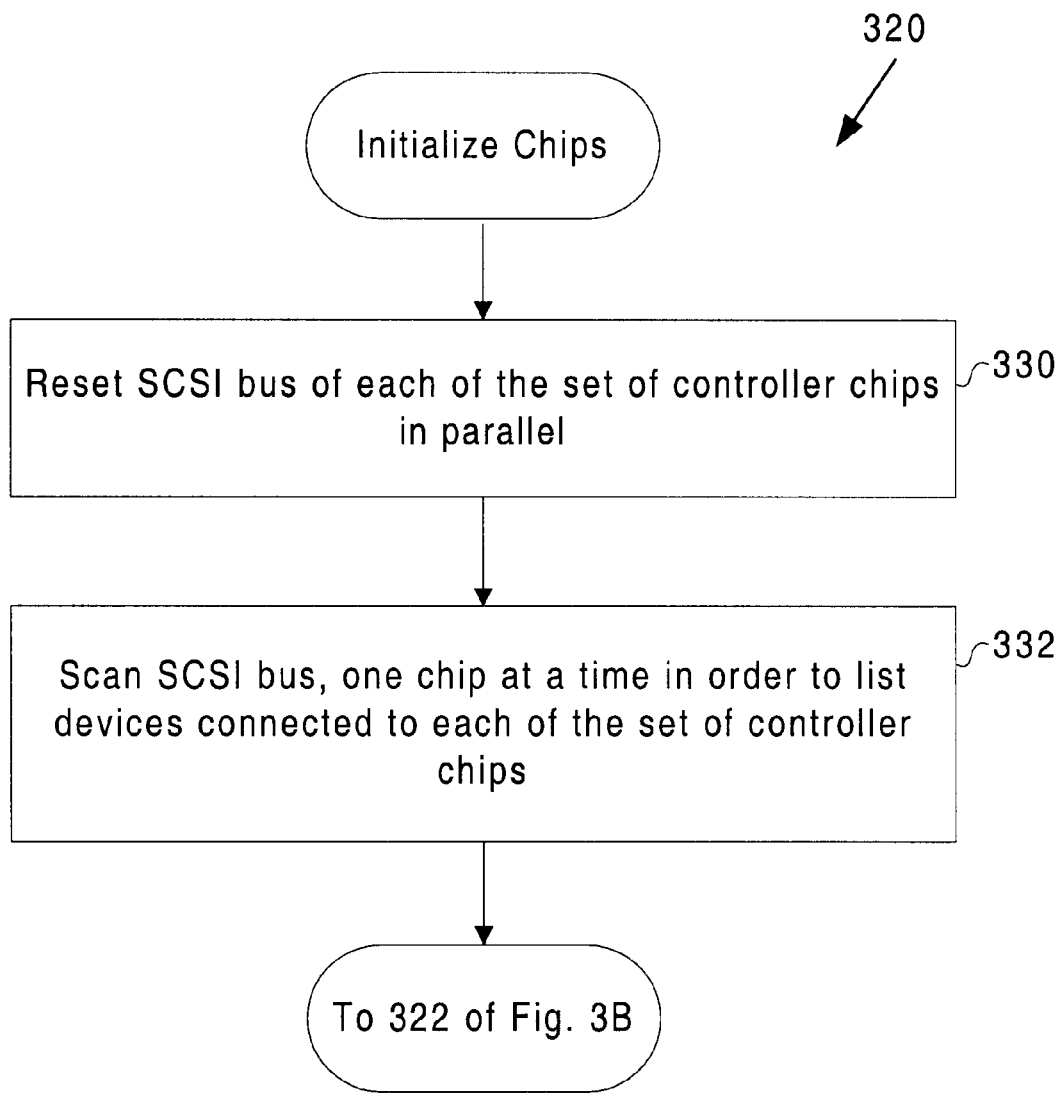
FIG. 4B illustrates a flowchart diagram for the reset of the SCSI bus and initialization of the chips of FIG. 4A, in accordance with one embodiment of the present invention.

FIG. 4B illustrates a flowchart diagram 320 for the initialization of the chips of FIG. 4A in accordance with one embodiment of the present invention. Operation 320 is an additional embodiment of the method operation 320 of FIG. 3B. In this embodiment, the SCSI bus for each of the controller chips is preferably reset in parallel. Once the parallel reset is performed, a standard waiting time of about two seconds is performed. Once the waiting period is complete, the method will proceed to an operation 332 where the SCSI bus is scanned, one chip at a time in order to list the devices connected to each of the set of controller chips of FIG. 4A. At this point, the initialization will be complete and the method may return to operation 322 of FIG. 3B where the standard boot operations are completed.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for initializing controller chips of a computer system, comprising:

integrating a set of controller chips to a motherboard;

generating a table identifying the set of controller chips and PCI device function addresses of the set of controller chips;

identifying one of the set of controller chips to be a master controlling chip and those other than the master controlling chip to be non-controlling chips;

generating a single generic option ROM code for the set of controller chips; and storing the table and the generic option ROM code in a system BIOS ROM of the computer system.

2. A method for initializing controller chips of a computer system as recited in claim 1, further comprising re-booting the computer system, the re-booting is configured to run a system BIOS of the computer system.

3. A method for initializing controller chips of a computer system as recited in claim 2, wherein the running of the system BIOS is configured to scan each of the set of controller chips that are integrated into the motherboard, and referring to the table stored in the system BIOS ROM;

determining whether a currently scanned one of the set of controller chips is the master controlling chip.

4. A method for initializing controller chips of a computer system as recited in claim 3, wherein if the currently scanned one of the set of controller chips is the master controlling chip, the generic option ROM code is copied to system RAM of the computer system.

5. A method for initializing controller chips of a computer system as recited in claim 4, further comprising:

passing control to the generic option ROM code, the generic option ROM code is configured to initialize each of the set of controller chips.

6. A method for initializing controller chips of a computer system as recited in claim 5, wherein once the set of controller chips are initialized using the generic option ROM code, the system RAM will only contain one BIOS image for the set of controller chips.

7. A method for initializing controller chips of a computer system as recited in claim 3, wherein if the currently scanned one of the set of controller chips is other than the master controlling chip, no option ROM code is copied to system RAM of the computer system.

8. A method for initializing controller chips of a computer system as recited in claim 7, further comprising:

continuing the scanning of the set of controller chips until the master controller chip is scanned; and copying the generic option ROM code to the system RAM; and passing control to the generic option ROM code.

9. A method for initializing controller chips of a computer system as recited in claim 8, further comprising:

initialization each of the set of controller chips by executing the generic option ROM code, the initialization beginning with the master controlling chip and proceeding to a remainder of the set of controller chips.

10. A method for generating a single image BIOS that functions with a plurality of controller chips, comprising:

providing a motherboard with the plurality of controller chips;

generating a generic option ROM code that is configured to operate with each of the plurality of controller chips;

generating a table that identifies each of the plurality of controller chips, and a PCI device function address for each of the plurality of controller chips, the table also having information as to which one of the plurality of controller chips is a master controlling chip and which are non-controlling chips, the generating of the generic option ROM code and the table defines an option ROM code; and storing the option ROM code to a system BIOS ROM that is part of the motherboard.

11. A method for generating a single image BIOS that functions with a plurality of controller chips as recited in claim 10, comprising:

loading the generic option ROM code to a system RAM of the motherboard when the master controlling chip is scanned for initialization.

12. A method for generating a single image BIOS that functions with a plurality of controller chips as recited in claim 10, comprising:

exiting without loading the generic option ROM code to a system RAM of the motherboard when any one of the non-controlling chips are scanned for initialization.

13. A method for generating a single image BIOS that functions with a plurality of controller chips as recited in claim 11, wherein when the master controlling chip is scanned for initialization, the master controlling chip and the non-controlling chips are scanned using the generic option ROM code.

14. A method for generating a single image BIOS that functions with a plurality of controller chips as recited in claim 13, wherein when the initialization of the master controlling chip and the non-controlling chips is complete, only a single image BIOS for the plurality of controller chips remains in the system RAM.

15. A motherboard, comprising:

a system RAM chip;

a set of controller chips; and a system BIOS ROM chip, the system BIOS chip including generic option ROM code and a table identifying each of the controller chips and associated PCI device function addresses for the controller chips, and a selected one of the set of controller chips being defined as a master controlling chip that will communicate with the generic option ROM code for initialization each one of the set of controller chips.

16. A motherboard as recited in claim 15, wherein the system RAM chip stores a single image of the generic option ROM code.

17. A motherboard as recited in claim 15, wherein at least one of the set of controller chips is a SCSI chip.

18. A motherboard as recited in claim 15, wherein the generic option ROM code includes initialization code and runtime code, and the runtime code is configured to facilitate communication for each of the initialized set of controller chips.

19. A motherboard as recited in claim 15, wherein the motherboard has a PCI bus and PCI connections to peripheral devices.

* * * * *

UNITED STATES PATENT AND TRADEMARK OFFICE
CERTIFICATE OF CORRECTION

| | |
|---|---|
| PATENT NO. | : 6,446,139 B1 |
| DATED | : September 3, 2002 |
| INVENTOR(S) | : Wendy Q. Leung, Sau Kuen Eng, and Felix Chinn |

It is certified that error appears in the above-identified patent and that said Letters Patent is hereby corrected as shown below:

<u>Title page,</u>
Item [75], Inventors, change Inventor's name from Sau Ken Eng" to
-- Sau Kuen Eng --

Signed and Sealed this

Twenty-fourth Day of December, 2002

JAMES E. ROGAN
*Director of the United States Patent and Trademark Office*